Patented Mar. 21, 1939

2,151,634

UNITED STATES PATENT OFFICE 2,151,634

ARYLAMINO-ARYLOXY-HYDROXY-ANTHRAQUINONES

Edwin C. Buxbaum, Shorewood, Wis., assignor to E. I. du Pont de Nemours & Company, Wilmington, Del., a corporation of Delaware No Drawing. Application August 25, 1937, Serial No. 160,827

3 Claims. (Cl. 260—373)

This invention relates to the preparation of new dyestuffs and dyestuff intermediates of the anthraquinone series. It relates more particularly to the preparation of new aryloxy-anthraquinone compounds and their sulfonation products which dye animal fibers in red to violet shades that on chroming are converted to gray to black shades of good fastness properties.

Considerable difficulty has been experienced in finding dyestuffs in the anthraquinone acid wool dyestuff field that will dye in satisfactory gray to black shades. A number of colors that dye in this range have been prepared, but they are deficient either in dyeing or fastness properties, or they are too costly to manufacture.

It is therefore an object of this invention to provide new acid wool dyestuffs in the anthraquinone field which on chroming give desirable gray to black shades of good fastness properties. It is a further object of the invention to provide new anthraquinone compounds which can be prepared from readily available intermediates and which are easily converted to acid wool dyestuffs on sulfonation.

I have found that anthraquinone compounds which carry at least one aryloxy group in a beta position, one arylamine group in either alpha or beta position, and at least one hydroxy group in alpha position, on sulfonation give new and valuable acid wool dyestuffs which on chroming by any of the usual chroming methods dye wool in gray to black shades, and that these colors possess good fastness properties to light and washing. By varying the position of the particular groups above mentioned on the anthraquinone molecule and by changing the number of the groups present various changes in shade of the resulting dyestuff can be made. Products may be obtained by this process which on chroming dye wool in from greenish gray to neutral and reddish gray shades, all of which in heavy dyeings dye black, the intensity or variation of the black from a reddish to greenish cast of course varying with the particular compounds employed. As set forth in the general description above, these compounds carry at least one aryloxy group in a beta position. The aryl radical of the aryloxy group of the anthraquinone nucleus has been found to sulfonate very readily in ordinarily strong sulfuric acid. On further sulfonation, for instance, by the use of stronger sulfuric acid or higher temperatures, additional sulfonic acid groups may be introduced in the arylamine radicals. 1-hydroxy-2,4-dihalogen anthraquinone, quinizarin and substituted quinizarins serve as starting material for the preparation of these dyestuffs, although it will be obvious that other hydroxy anthraquinone compounds may be employed.

The following examples are given to illustrate the invention more fully. The parts used are by weight.

Example 1

20 parts of phenoxyquinizarin are added to a mixture of 30 parts of ethyl alcohol, 30 parts of water, 14 parts of boric acid and 140 parts of p-toluidine. The temperature is brought to 90–93° C. and held there for 6 hours. The brown color of the mixture soon turns to red. When the reaction is finished, the mass is cooled to 70° C. and diluted with 40 parts of 80% alcohol. After stirring for 4 hours, the diluted condensation mixture is filtered off, washed with additional alcohol and dried. The compound so obtained is most likely 1-toluido-2-phenoxy-4-hydroxy anthraquinone.

When sulfonated in the usual manner with sulfuric acid monohydrate and 60% oleum, a dyestuff is obtained which dyes wool from an acid bath in violet shades which change into gray shades of good fastness to light and washing when chromed by any of the usual methods.

Example 2

25 parts of 2-p-phenyl-phenoxyquinizarin prepared from 2-chloroquinizarin and p-phenyl-phenol are added to 150 parts of aniline, 38 parts of water, 38 parts of alcohol, 17 parts of boric acid and 1 part of sodium hydrosulfite. The mass is heated to 90° C. for 6 hours until condensation is complete. The reaction mixture is then diluted with a suitable amount of alcohol, filtered, and dried. The 1-anilino-2-p-phenyl-phenoxy-4-hydroxyanthraquinone is sulfonated by dissolving in sulfuric acid monohydrate and isolated by the addition of 100 parts of cold water which precipitates the free acid in crystalline form.

The compound so obtained dyes wool from an acid bath in bright red shades which change to gray or black upon chroming by any of the usual dyeing methods. The chromed color when dyed either as a gray or a black exhibits good fastness to light and fulling.

Example 3

150 parts of 2-naphthoxyquinizarin, obtained by the interaction of beta-naphthol and 2-chloroquinizarin, are treated with 900 parts of aniline, 230 parts of water, 230 parts of alcohol, 111 parts of boric acid and 10 parts of sodium hydrosulfite. The temperature is raised to 90° C. and held there for approximately 6 hours or until a color change to red is observed. When the reaction is finished, alcohol is added to dilute the mass. The crystalline base is then filtered off and isolated in the usual manner.

The 1-anilino-2-naphthoxy-4-hydroxyanthraquinone is easily sulfonated by dissolving it in sulfuric acid monohydrate. The dyestuff dyes wool from an acid bath in red shades which upon chroming turn to gray shades of good fastness properties.

Example 4

15 parts of phenoxyquinizarin are added to 25 parts of ethyl alcohol, 25 parts of water, 13 parts of boric acid and 130 parts of o-toluidine. The reaction is heated for 6 hours to 90–95° C. and then cooled and diluted with ethyl alcohol. The crystalline 1-o-toluidino-2-phenoxy-4-hydroxyanthraquinone is sulfonated by dissolving it in 10 parts of 5% oleum and isolated by pouring out into a mixture of ice and water. The precipitated color is filtered off, washed acid-free with 10% brine and dried. The dyestuff dyes wool from an acid bath in red shades which change to gray upon chroming. The chromed dyestuff exhibits good fastness to light and washing.

Example 5

75 parts of 1-hydroxy-2-bromo-4-o-toluidinoanthraquinone are added to a previously dissolved mixture of 125 parts of potassium hydroxide in 500 parts of phenol. This mixture is heated to 160° C. for a period of 8 hours and then cooled and diluted with ethyl alcohol as described in previous examples. The isolated product is 1-hydroxy-2-phenoxy-4-o-toluidinoanthraquinone. It is easily sulfonated by dissolving it in monohydrate at room temperatures and isolating as in previous examples. It dyes wool and from an acid bath in violet shades which change to gray upon chroming.

Example 6

By using 1-hydroxy-2-bromo-4-meta-toluidino in place of the ortho derivative as described in Example 5, 1-hydroxy-2-phenoxy-4-meta-toluidinoanthraquinone is obtained which dyes wool in shades similar to that of the compound produced in Example 5.

Example 7

15 parts of 2-phenoxyquinizarin are added to 15 parts of 4-amino-4'-ethoxydiphenylamine, 8 parts of boric acid and 120 parts of nitrobenzene. The reaction mass is heated to 110–120° C. for 8 hours and then cooled and diluted with an equal volume of alcohol. The precipitated base which is probably 1-(4'-ethoxydiphenylamino)-2-phenoxy-4-hydroxyanthraquinone is filtered off, washed with alcohol and hot water and dried. It is easily sulfonated in sulfuric acid monohydrate and oleum and is isolated in the usual manner. The color obtained dyes wool in neutral gray shades when chromed by any of the usual methods.

Example 8

150 parts of 2-phenoxyquinizarin are added to 250 parts of alcohol, 250 parts of water, 130 parts of boric acid, and 1300 parts of p-xylidine. The mixture is refluxed at 90–95° C. for 6 hours until condensation is complete. The 1-xylidino-2-phenoxy-4-hydroxy is isolated and sulfonated in the usual manner. On wool when chromed, a gray dyestuff is obtained.

Example 9

150 parts of phenoxyquinizarin are added to 250 parts of ethyl alcohol, 250 parts of water, 130 parts of boric acid and 1000 parts of 2,5-dimethoxyaniline. The mixture is allowed to reflux at 90–95° C. for 6 hours. 1000 parts of ethyl alcohol are added and the mass is cooled to 30° C. The 1-(2',5'-dimethoxyanilido)2-phenoxy-4-hydroxyanthraquinone is precipitated out of solution and isolated in the usual manner.

Example 10

220 parts of anilinochloroquinizarin (obtained by the condensation of aniline and dichloroquinizarin obtained in turn by the direct chlorination of quinizarin in sulfuric acid) are added to a mixture of 300 parts of potassium hydroxide previously dissolved in 1700 parts of phenol. The entire mass is heated to 160–170° C. for a period of 8 hours and then cooled to 60° C. and diluted with 3000 parts of ethyl alcohol. The 2-anilidophenoxyquinizarin obtained is sulfonated by dissolving it in monohydrate and reprecipitating onto a mixture of ice and water which reduces the acidity to about 10%. The dyestuff is filtered off, washed acid-free with brine and dried. The dyestuff so obtained dyes wool from an acid bath in red shades which turn to gray and black when chromed by any of the usual dyeing methods. The dyestuff obtained in this manner shows good fastness both to light and fulling.

Example 11

50 parts of bromoanilinoquinizarin (obtained by the condensation of dibromoquinizarin with aniline in turn prepared by the dibromination of quinizarin with sulfuryl chloride and bromine) are added to a mixture previously dissolved at 90° C. of 25 parts of potassium hydroxide in 150 parts of phenol and 150 parts of o-dichlorobenzene and the mixture is heated to 160° C. for 12 hours. The mass is cooled to 60° C. and, if necessary, a small amount of alcohol may be added to keep the mass fluid. The reaction mass is then steam distilled free from phenol and dichlorobenzene, filtered, and sucked dry. The phenoxyanilinoquinizarin obtained comes out in very crystalline form and can be easily sulfonated in the usual manner with sulfuric acid monohydrate. The dyestuff so obtained dyes wool from an acid bath in red shades which change to gray on chroming and exhibit good fastness to light and fulling. The dyestuff obtained appears to be identical with that obtained in Example 10.

Example 12

If the product of Example 11 is sulfonated with 5–20% oleum, a very soluble product is obtained which can be isolated by pouring into ice and water and adding sufficient salt to bring out the dyestuff. The product so obtained dyes wool both straight and chromed in shades which are redder than those of Example 11.

I claim:

1. Anthraquinone compounds which carry in the molecule one arylamino- radical, at least one —OH group in an alpha position, and an aryloxy- radical in a beta position, which compounds on sulfonation yield acid wool dyestuffs that dye wool in red to violet shades convertible to gray to black shades on chroming.

2. Compounds of the class consisting of 1-arylamino-4-hydroxyanthraquinones carrying an aryloxy radical in a beta position, and their sulfonation products.

3. A compound of the class consisting of a beta-arylamine-beta-aryloxyquinizarin, and its sulfonation products.

EDWIN C. BUXBAUM.